United States Patent
Nagano

(10) Patent No.: US 8,842,212 B2
(45) Date of Patent: Sep. 23, 2014

(54) OPTICAL DEVICE AND FOCUS STATE DETECTION METHOD

(75) Inventor: Akihiko Nagano, Ichihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 13/262,496

(22) PCT Filed: Apr. 28, 2010

(86) PCT No.: PCT/JP2010/057915
§ 371 (c)(1),
(2), (4) Date: Sep. 30, 2011

(87) PCT Pub. No.: WO2010/134444
PCT Pub. Date: Nov. 25, 2010

(65) Prior Publication Data
US 2012/0033128 A1    Feb. 9, 2012

(30) Foreign Application Priority Data
May 19, 2009 (JP) ................................. 2009-121348

(51) Int. Cl.
*H04N 5/232* (2006.01)
*G03B 13/00* (2006.01)
*G03B 13/36* (2006.01)
*H04N 5/369* (2011.01)
*G02B 7/34* (2006.01)
*G03B 17/00* (2006.01)
*G03B 7/099* (2014.01)
*G02B 7/28* (2006.01)
*H04N 101/00* (2006.01)

(52) U.S. Cl.
CPC ............ *G03B 13/36* (2013.01); *H04N 2101/00* (2013.01); *H04N 5/23212* (2013.01); *H04N 5/3696* (2013.01); *G02B 7/34* (2013.01)

USPC ............ 348/349; 348/345; 348/353; 396/79; 396/119

(58) Field of Classification Search
CPC ............ H04N 5/3696; H04N 5/23212; H04N 5/2254; H04N 5/335; G03B 13/36
USPC ................. 348/345–357; 396/79–83, 89–152
See application file for complete search history.

(56) References Cited

U.S. PATENT DOCUMENTS

| 4,410,804 A | 10/1983 | Stauffer |
|---|---|---|
| 4,816,663 A | 3/1989 | Utagawa et al. |

(Continued)

FOREIGN PATENT DOCUMENTS

| EP | 0 981 245 A2 | 2/2000 |
|---|---|---|
| JP | 58-024105 | 2/1983 |

(Continued)

*Primary Examiner* — Sinh Tran
*Assistant Examiner* — Christopher K Peterson
(74) *Attorney, Agent, or Firm* — Fitzpatrick, Cella, Harper & Scinto

(57) ABSTRACT

An optical device comprises an image sensor having plural pixels and a detection unit configured to detect a focus state. The pixels include first focus state detection pixel pairs that respectively receive a pair of light fluxes having transmitted different pupil areas of the photographing lens, and second focus state detection pixel pairs that respectively receive a pair of light fluxes having transmitted pupil areas shifted by a predetermined amount from the pupil areas where the pair of light fluxes received by the first focus state detection pixel pairs have transmitted. The detection unit detects the focus state based on signal pairs obtained by adding the signals output from the first and second focus state detection pixel pairs, respectively, if a subject to be photographed is darker than a predetermined brightness, otherwise the detection unit detects the focus state based on signal pairs output from the first and second focus state detection pixel pairs, respectively.

4 Claims, 10 Drawing Sheets

(56) References Cited

U.S. PATENT DOCUMENTS

| | | |
|---|---|---|
| 6,829,008 B1 | 12/2004 | Kondo et al. |
| 7,060,961 B2 | 6/2006 | Dobashi et al. |
| 7,245,324 B2 | 7/2007 | Namazue et al. |
| 7,488,923 B2 | 2/2009 | Kusaka |
| 2007/0237512 A1 | 10/2007 | Kusaka |
| 2008/0317454 A1* | 12/2008 | Onuki ............................ 396/128 |
| 2009/0200451 A1* | 8/2009 | Conners ..................... 250/208.1 |
| 2011/0063484 A1 | 3/2011 | Fujii et al. |
| 2011/0096211 A1 | 4/2011 | Oikawa et al. |
| 2011/0096212 A1 | 4/2011 | Oikawa |

FOREIGN PATENT DOCUMENTS

| | | |
|---|---|---|
| JP | 59-133512 | 7/1984 |
| JP | 62-229213 | 10/1987 |
| JP | 5-127074 | 5/1993 |
| JP | 2959142 | 10/1999 |
| JP | 2000-156823 A | 6/2000 |
| JP | 2002-258142 | 9/2002 |
| JP | 2005-106994 | 4/2005 |
| JP | 2006-071656 | 3/2006 |
| JP | 2006-208802 | 8/2006 |
| JP | 2007-133087 | 5/2007 |
| JP | 2007-155929 A | 6/2007 |
| JP | 2008-103885 | 5/2008 |
| JP | 2008-147821 A | 6/2008 |
| JP | 2008-224801 | 9/2008 |
| JP | 2009-015164 | 1/2009 |
| JP | 2009-145527 | 7/2009 |
| JP | 2009-204987 | 9/2009 |
| WO | 2008/132812 | 11/2008 |

* cited by examiner

OPTICAL DEVICE AND FOCUS STATE DETECTION METHOD

TECHNICAL FIELD

The present invention relates to an optical device and a focus detection method, and more particularly to an optical device, such as a digital still camera that is capable of detecting a focus state of a photographing lens based on an image that is obtained from an image sensor used for sensing an image, and to focus detection method.

BACKGROUND ART

There are several ways available that detect a focus state of a photographing lens in a digital camera that performs photographing using an image sensor. An apparatus disclosed in Japanese Patent Laid-Open No. 58-24105 is designed to perform focus state detection based on a pupil division method using a two-dimensional sensor having a microlens formed at each pixel on the sensor. According to the apparatus disclosed in Japanese Patent Laid-Open No. 58-24105, a photoelectric converter of each pixel of the image sensor is divided into a plurality of parts. The photoelectric converter that is divided in this manner is designed to receive light beams transmitted through different areas on a pupil of a photographing lens through a microlens.

Further, Japanese Patent No. 2959142 discloses a solid-state image sensing apparatus that also serves as an image sensor, in which pixels whose relative positions between a microlens and a photoelectric converter are shifted are arranged two-dimensionally. According to the solid-state image sensing apparatus disclosed in Japanese Patent No. 2959142, when detecting a focus state of a photographing lens, the focus state of the lens is detected based on images generated with pixel arrays that have different relative shift directions between a microlens and a photoelectric converter. In contrast, when sensing a normal image, adding pixels that correspond to each other and that have different relative shift directions between a microlens and a photoelectric converter generates an image.

The present applicant disclosed a solid-state image sensing apparatus that performs focus state detection based on a pupil division method using a CMOS-type image sensor (solid-state image sensing apparatus) that is used in a digital still camera in Japanese Patent Laid-Open No. 2005-106994. According to the solid-state image sensing apparatus disclosed in Japanese Patent Laid-Open No. 2005-106994, some pixels among a large number of pixels constituting the solid-state image sensing apparatus have a configuration in which a photoelectric converter for detecting a focus state of a photographing lens is divided into two sections. The photoelectric converter is designed to receive light beams transmitted through a predetermined area on a pupil of the photographing lens through a microlens.

FIG. 10 is an explanatory view concerning the distribution of received light of a pixel that performs focus state detection that is positioned at the center of the solid-state image sensing element disclosed in Japanese Patent Laid-Open No. 2005-106994, and shows areas on the pupil of the photographing lens which pass light that the two sections of the photoelectric converter divided into two parts can receive, respectively. The circle in the figure denotes an exit pupil of the photographing lens, and the white areas Sα and Sβ are areas which pass light, that the photoelectric converter that is divided into two parts, can receive. These areas are normally designed so as to be symmetric with respect to the optical axis of a photographing lens (point of intersection of x-axis and y-axis in the figure).

In the camera, a correlation operation is performed with respect to an image that is generated by light beams transmitted through the area Sα on the pupil of the photographing lens and an image that is generated by light beams transmitted through the area Sβ to detect a focus state of the photographing lens. A method that performs focus state detection by performing a correlation operation with respect to images generated by light beams transmitted through different pupil areas of a photographing lens is disclosed in Japanese Patent Laid-Open No. 5-127074.

In general, a CMOS-type solid-state image sensing element is manufactured by being subjected to multiple mask processes. Although the manufacturing is performed while alignment is performed between each mask process, misalignments occur between members manufactured at an initial stage and members manufactured at subsequent stages. That is, since a photoelectric converter of a solid-state image sensing element is formed at an initial stage of the manufacturing process and a microlens is formed at a final stage thereof, a misalignment often occurs between the photoelectric converter and the microlens.

FIG. 11A and FIG. 11B are views that illustrate the distribution of received light of a solid-state image sensing element on a pupil of a photographing lens. FIG. 11A shows the distribution on a light receiving area in a case in which there is a deviation from a designed value with respect to positions of photoelectric converters and a position of a microlens on a pixel that performs focus state detection in which a photoelectric converter is divided into two parts. In FIGS. 11A and 11B, a light receiving area Sα of one of the photoelectric converters and a light receiving area Sβ of the other photoelectric converter deviate in the −x direction with respect to the optical axis of the photographing lens (point of intersection of x-axis and y-axis in the figure).

When detecting a focus state of a photographing lens of a camera, normally focus state detection is possible not only with respect to a subject that is located in the center of the photographing screen, but also with respect to a subject located at the periphery of the photographing screen.

FIG. 11B is a view that describes the distribution of received light of a focus state detection pixel arranged at the periphery of a photographing screen, in a solid-state image sensing element in which the positions of photoelectric converters and the position of a microlens deviate from a designed value. Since vignetting of light beams by the lens frame of the photographing lens occurs at the periphery of the photographing screen, the light receiving area Sα corresponding to one of the photoelectric converters narrows as shown in FIG. 11B.

Consequently, the degree of agreement between an image generated by light beams transmitted through the area Sα on the pupil of the photographing lens and an image generated by light beams transmitted through the area Sβ decreases. As a result, even when a correlation operation is performed based on an image generated by light beams transmitted through the area Sα and an image generated by light beams transmitted through the area Sβ, there is the drawback that it is not possible to perform focus state detection with a high accuracy.

Further, since a distribution of received light on the pupil of the photographing lens of a pixel group forming a part of the solid-state image sensing apparatus which detects a focus state of the photographing lens has a band shape, the output from the pixel group tends to be affected by noise when a subject is dark or the contrast of the subject is small. Therefore, there is the drawback that it is not possible to perform focus state detection with a high accuracy.

SUMMARY OF INVENTION

The present invention has been made in consideration of the above situation, and the present invention reduces the effects of noise in focus state detection based on a pupil division method when a subject is dark or the contrast of the subject is small.

According to one aspect of the present invention, there is provided an optical device comprising: an image sensor having a plurality of pixels configured to output signals to be used for detecting a focus state of a photographing lens, the plurality of pixels including: a plurality of first focus state detection pixel pairs that respectively receive a pair of light fluxes having transmitted different pupil areas of the photographing lens, and a plurality of second focus state detection pixel pairs that respectively receive a pair of light fluxes having transmitted pupil areas shifted by a predetermined amount from the pupil areas of the photographing lens where the pair of light fluxes received by the first focus state detection pixel pairs have transmitted; and a detection unit configured to detect the focus state based on the signals output from the first and second focus state detection pixel pairs, wherein the detection unit detects the focus state based on signal pairs obtained by adding the signals output from the plurality of first focus state detection pixel pairs and the signals output from the plurality of second focus state detection pixel pairs, respectively, if a subject to be photographed is darker than a predetermined brightness, and detects the focus state based on signal pairs output from the plurality of first focus state detection pixel pairs and signal pairs output from the plurality of second focus state detection pixel pairs, respectively, if a subject to be photographed is the same or brighter than a predetermined brightness.

According to another aspect of the present invention, there is provided an optical device comprising: an image sensor having a plurality of pixels configured to output signals to be used for detecting a focus state of a photographing lens, the plurality of pixels including: a plurality of first focus state detection pixel pairs that respectively receive a pair of light fluxes having transmitted different pupil areas of the photographing lens, and a plurality of second focus state detection pixel pairs that respectively receive a pair of light fluxes having transmitted pupil areas shifted by a predetermined amount from the pupil areas of the photographing lens where the pair of light fluxes received by the first focus state detection pixel pairs have transmitted; and a first detection unit configured to detect a first focus state by detecting and averaging focus states respectively based on the signals output from the first and second focus state detection pixel pairs; a second detection unit configured to detect a second focus state based on signal pairs obtained by adding the signals output from the plurality of first focus state detection pixel pairs and the signals output from the plurality of second focus state detection pixel pairs; and a selection unit configured to select one of the first focus state and the second focus state in accordance with contrast of a subject to be photographed.

According to still another aspect of the present invention, there is provided a focus detection method in an optical device comprising an image sensor having a plurality of pixels for outputting signals to be used for detecting a focus state of a photographing lens, the plurality of pixels including a plurality of first focus state detection pixel pairs that respectively receive a pair of light fluxes having transmitted different pupil areas of the photographing lens, and a plurality of second focus state detection pixel pairs that respectively receive a pair of light fluxes having transmitted pupil areas shifted by a predetermined amount from the pupil areas of the photographing lens where the pair of light fluxes received by the first focus state detection pixel pairs have transmitted, the method comprising: a determination step of determining whether or not a subject to be photographed is brighter than a predetermined brightness; a first detection step of detecting the focus state based on signal pairs obtained by adding the signals output from the plurality of first focus state detection pixel pairs and the signals output from the plurality of second focus state detection pixel pairs, respectively, if the subject to be photographed is darker than a predetermined brightness; and a second detection step of detecting the focus state based on signal pairs output from the plurality of first focus state detection pixel pairs and signal pairs output from the plurality of second focus state detection pixel pairs, respectively, if a subject to be photographed is the same or brighter than a predetermined brightness.

According to yet another aspect of the present invention, there is provided a focus detection method in an optical device comprising an image sensor having a plurality of pixels for outputting signals to be used for detecting a focus state of a photographing lens, the plurality of pixels including a plurality of first focus state detection pixel pairs that respectively receive a pair of light fluxes having transmitted different pupil areas of the photographing lens, and a plurality of second focus state detection pixel pairs that respectively receive a pair of light fluxes having transmitted pupil areas shifted by a predetermined amount from the pupil areas of the photographing lens where the pair of light fluxes received by the first focus state detection pixel pairs have transmitted, the method comprising: a first detection step of detecting a first focus state by detecting and averaging focus states respectively based on the signals output from the first and second focus state detection pixel pairs; a second detection step of detecting a second focus state based on signal pairs obtained by adding the signals output from the plurality of first focus state detection pixel pairs and the signals output from the plurality of second focus state detection pixel pairs; and a selection step of selecting one of the first focus state and the second focus state in accordance with contrast of a subject to be photographed.

Further features of the present invention will become apparent from the following description of exemplary embodiments (with reference to the attached drawings).

DESCRIPTION OF EMBODIMENTS

Preferred embodiments of the present invention will be described in detail in accordance with the accompanying drawings.

First Embodiment

Figure 1:
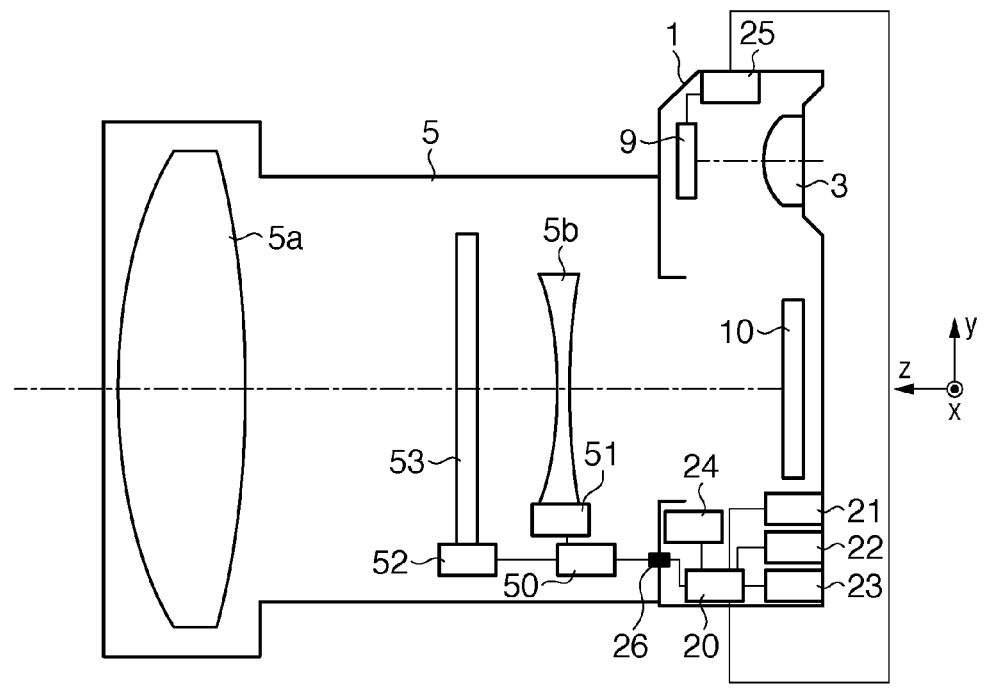
FIG. 1 is a view showing a schematic configuration of a digital camera according to an embodiment of the present invention.

FIG. 1 is a view that shows a schematic configuration of a digital camera as an example of an image sensing apparatus according to the first embodiment.

A digital camera shown in FIG. 1 mainly includes a camera main unit 1 and a photographing lens 5 that is detachable from the camera main unit 1. First, the configuration of the camera main unit 1 will be described.

Reference numeral 10 denotes an image sensor comprising a plurality of pixels that is disposed on a planned image forming plane of the photographing lens 5. Reference numeral 20 denotes a CPU that controls the entire camera. Reference numeral 21 denotes an image sensor control circuit that controls driving of the image sensor 10. The CPU 20 also calculates a focus state of the photographing lens 5. Reference numeral 24 denotes an image processing circuit that performs image processing of image signals picked up by the image sensor 10; 25, a liquid crystal display element driving circuit that drives a liquid crystal display element 9 that displays an image that has undergone image processing; 3, an ocular lens 3 for observing a subject image that is displayed by the liquid crystal display element 9; 22, a memory circuit that records images picked up by the image sensor 10; and 23, an interface circuit for outputting an image that has undergone image processing at the image processing circuit 24 to the outside of the camera. The memory circuit 22 is configured to be able to also record a distribution of received light of the image sensor 10.

Next, the configuration of the photographing lens 5 will be described.

Reference numerals 5a and 5b denote lenses. Although in this case two lenses 5a and 5b are illustrated for the purpose of convenience, in actuality the photographing lens 5 includes a large number of lenses. The photographing lens 5 receives focus adjustment information that is sent from the CPU 20 of the camera main unit 1 with a lens CPU 50 through an electrical contact 26, and adjusts an in-focus state using a photographing lens driving mechanism 51 based on the focus adjustment information. Reference numeral 53 denotes a diaphragm apparatus that is disposed in the vicinity of a pupil of the photographing lens 5. The diaphragm apparatus 53 is configured to be narrowed to a predetermined diaphragm value by a diaphragm driving mechanism 52. The photographing lens 5 stores vignetting information of light beams with respect to image height.

Figure 2:
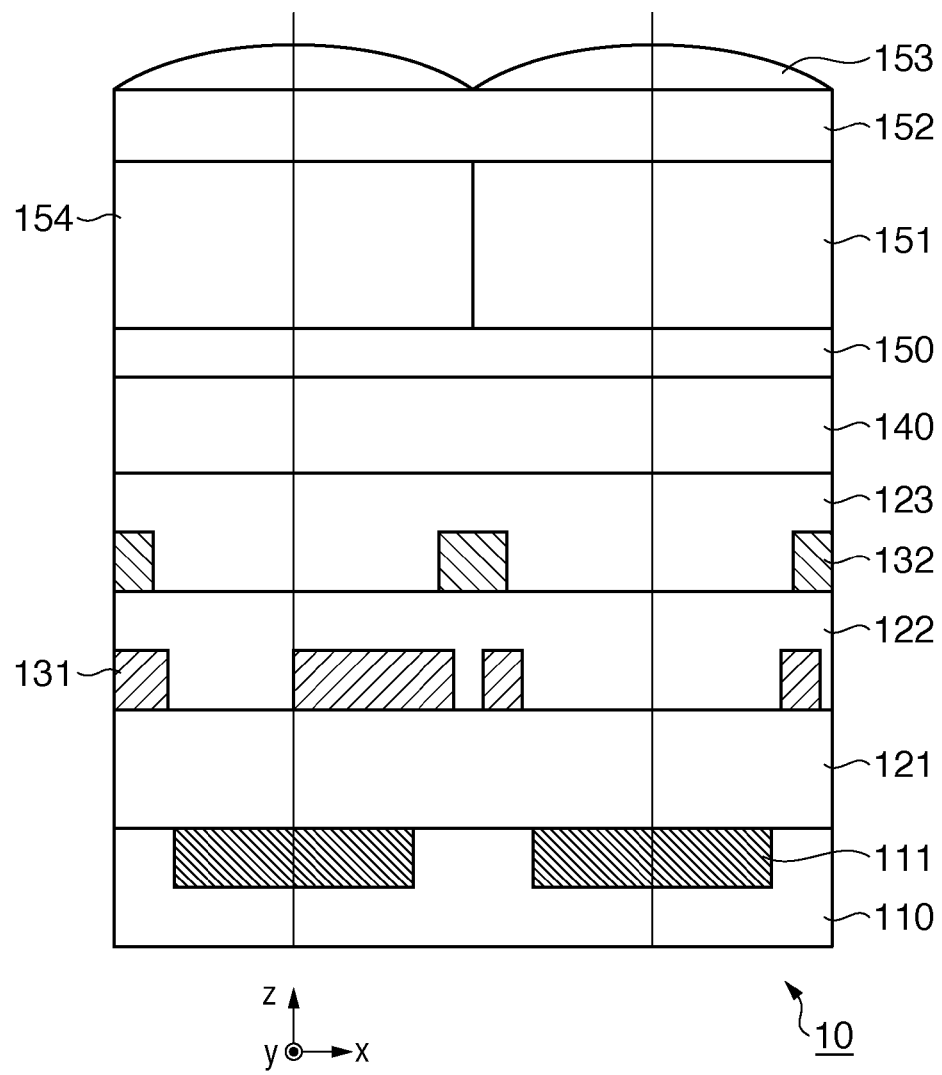
FIG. 2 is a partial cross-sectional view of an image sensor shown in FIG. 3.

FIG. 2 is a partial sectional view of the image sensor 10 along a plane A-A' of the image sensor 10 shown in FIG. 3 which will be described later.

The pixel on the right side of FIG. 2 represents a normal imaging pixel that is capable of receiving light beams transmitted through the entire pupil area of the photographing lens 5. The pixel on the left side of FIG. 2 represents a focus state detection pixel that is capable of receiving light beams transmitted through a part of the pupil area of the photographing lens 5.

As shown in FIG. 2, a photoelectric converter 111 is formed inside a silicon substrate 110. A signal charge that is generated with the photoelectric converter 111 is output to the outside through an unshown floating diffusion portion, a first electrode 131, and a second electrode 132. An interlayer dielectric film 121 is formed between the photoelectric converter 111 and the first electrode 131. An interlayer dielectric film 122 is formed between the first electrode 131 and the second electrode 132. An interlayer dielectric film 123 is formed on an incident light side of the second electrode 132, and a passivation film 140 and a planarized layer 150 are formed thereon. A color filter layer 151 or a transparent filter layer 154, a planarized layer 152, and a microlens 153 are formed on the incident light side of the planarized layer 150. In this case, the power of the microlens 153 is designed so that the pupil of the photographing lens 5 and the photoelectric converter 111 become substantially conjugate with each other. In a pixel positioned at the center of the image sensor 10, the microlens 153 is disposed at the center of the pixel. In a pixel positioned at a periphery of the image sensor 10, the microlens 153 is disposed in a condition in which the microlens 153 is shifted to the optical axis side of the photographing lens 5.

Subject light transmitted through the photographing lens 5 is condensed in the vicinity of the image sensor 10. Further, light that arrives at each pixel of the image sensor 10 is refracted by the microlens 153 and is condensed to the photoelectric converter 111. In the pixel on the right side in FIG. 2 that is used for normal imaging, the first electrode 131 and the second electrode 132 are arranged so as not to prevent the transmittance of incident light.

In contrast, in the focus state detection pixel on the left side, a part of the first electrode 131 is arranged so as to cover the photoelectric converter 111. As a result, the focus state detection pixel on the left side is capable of receiving light beams transmitted through a part of the pupil of the photographing lens 5. Further, in order to suppress a decrease in the output of the photoelectric converter 111 which is blocked by the first electrode 131 that a part of incident light beams enter, the transparent filter layer 154 of the focus state detection pixel is formed with a resin with a high transmissivity that does not absorb light.

Focus state detection pixels arranged at a part of the image sensor 10 of the first embodiment are configured so as to vary the distribution of received light of the photographing lens 5 by varying relative position between the microlens 153 and the aperture centers of the first electrodes 131.

Figure 3:
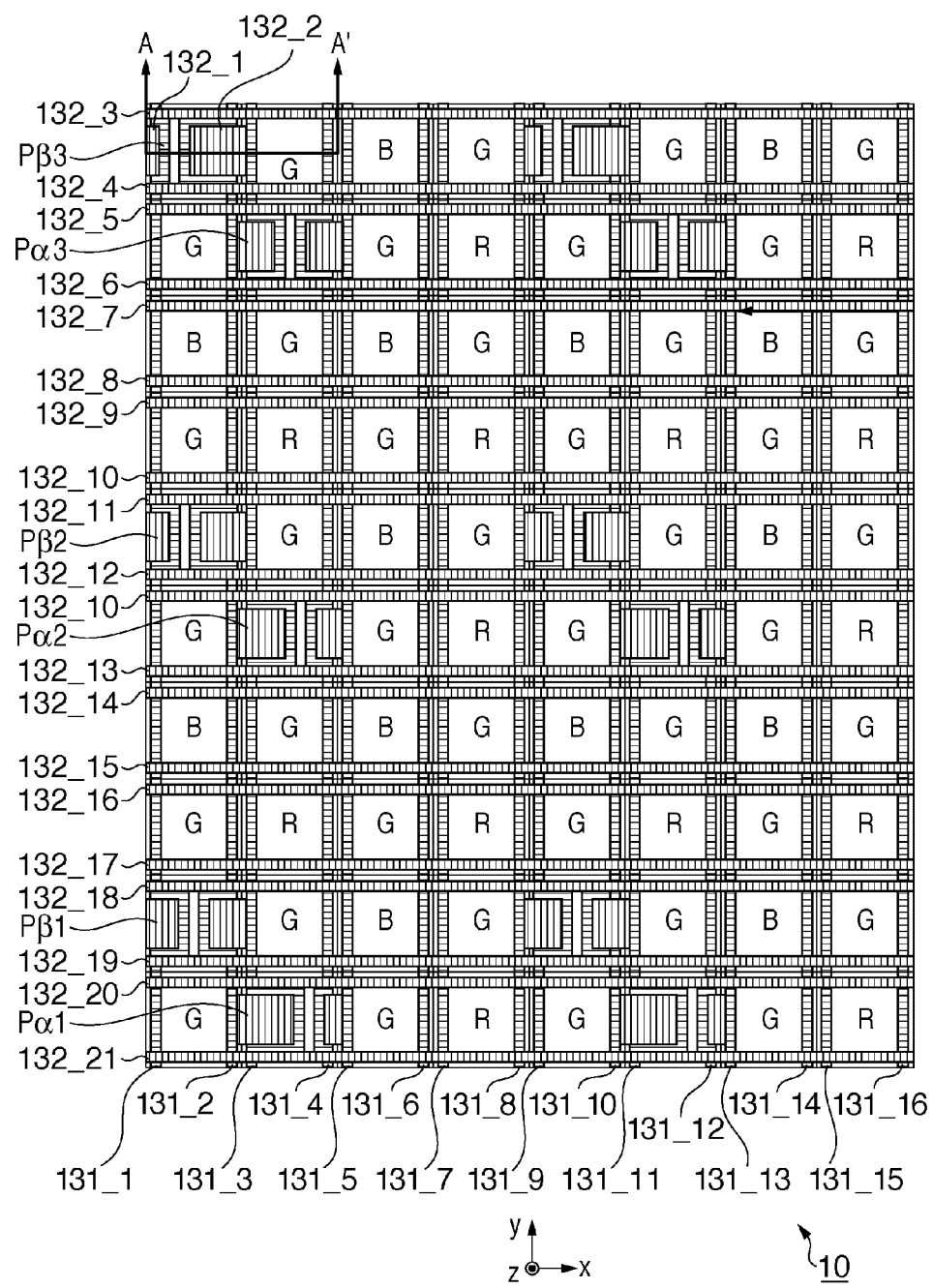
FIG. 3 is a partial plan view of the image sensor according to the embodiment of the present invention.

FIG. 3 is a partial plan view of the image sensor 10.

In FIG. 3, an area defined by the first electrodes 131 and second electrodes 132 represents a single pixel. The characters "R", "G", and "B" that are written in respective pixels denote the hue of a color filter of the respective pixel. In a pixel in which the character "R" is written, the color filter transmits a red light component, in a pixel in which the character "G" is written, the color filter transmits a green light component, and in a pixel in which the character "B" is written, the color filter transmits a blue light component. Further, the respective pixels in which the character "R", "G", or "B" is written are configured so as to receive light of the entire pupil area of the photographing lens 5.

When the array of color filters is a Bayer array, pixels are arranged so that "R" and "G" pixels and "B" and "G" pixels are alternately disposed. In the image sensor 10 according to the first embodiment, focus state detection pixels that receive light beams transmitted through part of pupil area of the photographing lens 5 are assigned to some positions where an "R" or a "B" pixel ought to be. In the figure, reference characters Pα1, Pβ1, Pα2, Pβ2, Pα3, and Pβ3 denote pixels for detecting a focus state of the photographing lens 5. In these pixels, an aperture in the x direction is limited by the first electrode 131 (light shielding member).

With regard to the pixels for focus state detection that are disposed at parts of the image sensor 10 of the first embodiment, five different kinds of pixels are designed in which an aperture center position within a pixel in the x direction of the aperture that is limited by the first electrode 131 is different with respect to the pixel center.

For example, for the focus state detection pixel Pα1 in which an aperture that is defined by an electrode 131_3 and an electrode 131_4 is shifted in the +x direction with respect to the pixel center, a focus state detection pixel having a similar electrode aperture is disposed at a position adjacent to a fourth pixel in the x direction. Further, the focus state detection pixel Pβ1 in which an aperture that is defined by an electrode 131_1 and an electrode 131_2 approximately matches the pixel center is disposed at a position that is diagonally adjacent to the focus state detection pixel Pα1. Furthermore, with respect to the focus state detection pixel Pβ1, a focus state detection pixel having a similar electrode aperture is disposed at a position that is adjacent to a fourth pixel in the x direction.

Furthermore, the focus state detection pixels Pα2 and Pβ2, and the focus state detection pixels Pα3 and Pβ3 in which apertures that are defined by the electrodes 131 are different from each other are disposed in similar manner. As shown in FIG. 3, aperture positions in pixel of the focus state detection pixels Pα2 and Pβ2, and the focus state detection pixels Pα3 and Pβ3 are shifted by predetermined amounts with respect to aperture positions of the focus state detection pixels Pα1 and Pβ1. By shifting the aperture positions, it is possible to obtain signals from respective focus state detection pixel pairs generated by photoelectric conversion of the light beams which have transmitted through different pupil areas.

Figure 4:
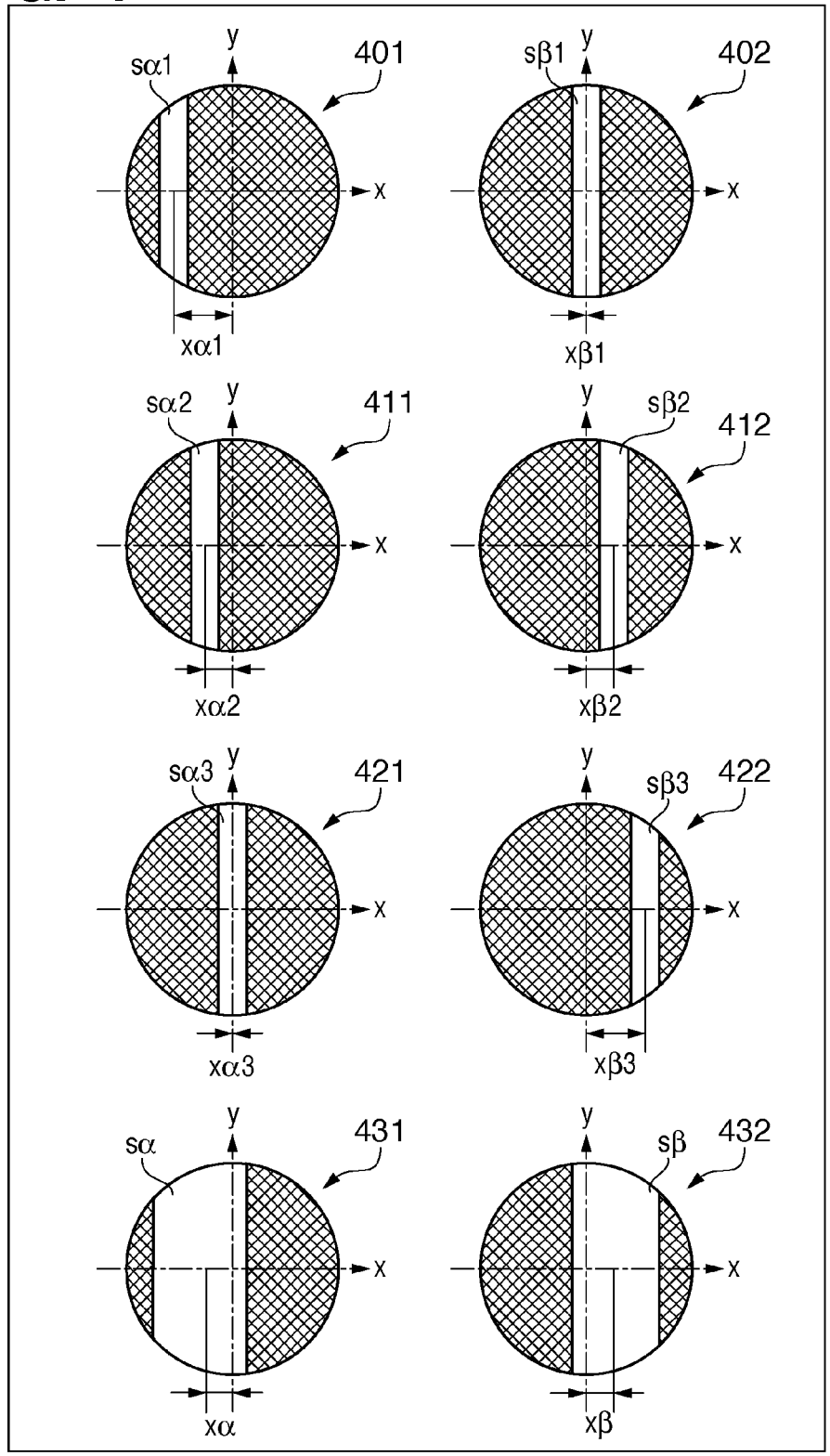
FIG. 4 is a view illustrating an example of a designed distribution of received light on a pupil of a photographing lens of a focus state detection pixel that is arranged at a part of the image sensor according to a first embodiment of the present invention.

FIG. 4 is a view that illustrates examples of the designed distribution of received light on the pupil of the photographing lens 5 of focus state detection pixels arranged at a part of the image sensor 10 in a case where relative position between an aperture of a focus detection pixel defined by the electrodes 131 and the microlens 153 are almost aligned as designed.

In FIG. 4, reference numeral 401 denotes the designed distribution of received light on the pupil of the photographing lens 5 of the focus state detection pixel Pα1 shown in the partial plan view of the image sensor 10 in FIG. 3. The center of an aperture defined by the electrode 131_3 and electrode 131_4 of the focus state detection pixel Pα1 is shifted significantly in the +x direction with respect to the center of the pixel. Therefore, the center of an area Sα1, that is capable of receiving light (referred to as "light receiving area Sα1" hereinafter), of the photoelectric converter of the focus state detection pixel Pα1 is shifted by a distance −xα1 with respect to the optical axis (point of intersection of x-axis and y-axis in the figure) on the x-axis on the exit pupil of the photographing lens 5.

Reference numeral 402 denotes the designed distribution of received light on the pupil of the photographing lens 5 of the focus state detection pixel Pβ1 shown in the partial plan view of the image sensor 10 in FIG. 3. The center of an aperture defined by the electrode 131_1 and electrode 131_2 of the focus state detection pixel Pβ1 approximately matches the center of the pixel. Therefore, the center of an area Sβ1, that is capable of receiving light (referred to as "light receiving area Sβ1" hereinafter), of the photoelectric converter of the focus state detection pixel Pβ1 approximately matches the optical axis (point of intersection of x-axis and y-axis in the figure) on the x-axis in the figure on the exit pupil of the photographing lens 5.

Reference numeral 411 denotes the designed distribution of received light on the pupil of the photographing lens 5 of the focus state detection pixel Pα2 shown in the partial plan view of the image sensor 10 in FIG. 3. The center of an aperture defined by the electrode 131_3 and electrode 131_4 of the focus state detection pixel Pα2 is shifted by a predetermined amount in the +x direction with respect to the center of the pixel. Therefore, the center of an area Sα2, that is capable of receiving light (referred to as "light receiving area Sα2" hereinafter), of the photoelectric converter of the focus state detection pixel Pα2 is shifted by a distance −xα2 with respect to the optical axis (point of intersection of x-axis and y-axis in the figure) on the x-axis on the exit pupil of the photographing lens 5.

Reference numeral 412 denotes the designed distribution of received light on the pupil of the photographing lens 5 of the focus state detection pixel Pβ2 shown in the partial plan view of the image sensor 10 in FIG. 3. The center of an aperture defined by the electrode 131_1 and electrode 131_2 of the focus state detection pixel Pβ2 is shifted by a predetermined amount in the −x direction with respect to the center of the pixel. Therefore, the center of an area Sβ2, that is capable of receiving light (referred to as "light receiving area Sβ2" hereinafter), of the photoelectric converter of the focus state detection pixel Pβ2 is shifted by a distance xβ2 with respect to the optical axis (point of intersection of x-axis and y-axis in the figure) on the x-axis on the exit pupil of the photographing lens 5.

Reference numeral 421 denotes the designed distribution of received light on the pupil of the photographing lens 5 of the focus state detection pixel Pα3 shown in the partial plan view of the image sensor 10 in FIG. 3. The center of an aperture defined by the electrode 131_3 and electrode 131_4 of the focus state detection pixel Pα3 approximately matches the center of the pixel. Therefore, the center of an area Sα3, that is capable of receiving light (referred to as "light receiving area Sα3" hereinafter), of the photoelectric converter of the focus state detection pixel Pα3 approximately matches the optical axis (point of intersection of x-axis and y-axis in the figure) on the x-axis in the figure on the exit pupil of the photographing lens 5. In this case, the designed distribution of received light on the pupil of the photographing lens 5 of the focus state detection pixel Pα3 approximately matches the designed distribution of received light on the pupil of the photographing lens 5 of the focus state detection pixel Pβ1.

Reference numeral 422 denotes the designed distribution of received light on the pupil of the photographing lens 5 of the focus state detection pixel Pβ3 shown in the partial plan view of the image sensor 10 in FIG. 3. The center of an aperture defined by the electrode 131_1 and electrode 131_2 of the focus state detection pixel Pβ3 is shifted significantly in the −x direction with respect to the center of the pixel. Therefore, the center of an area 43, that is capable of receiving light (referred to as "light receiving area Sα3" hereinafter), of the photoelectric converter of the focus state detection pixel Pβ3 is shifted by a distance 43 with respect to the optical axis (point of intersection of x-axis and y-axis in the figure) on the x-axis in the figure on the exit pupil of the photographing lens 5.

Reference numeral 431 denotes the collective distribution of received light of the focus state detection pixels Pα1, Pα2 and Pα3 of the image sensor 10, and reference numeral 432 denotes the collective distribution of received light of the focus state detection pixels Pβ1, Pβ2 and Pβ3 of the image sensor 10.

Figure 5:
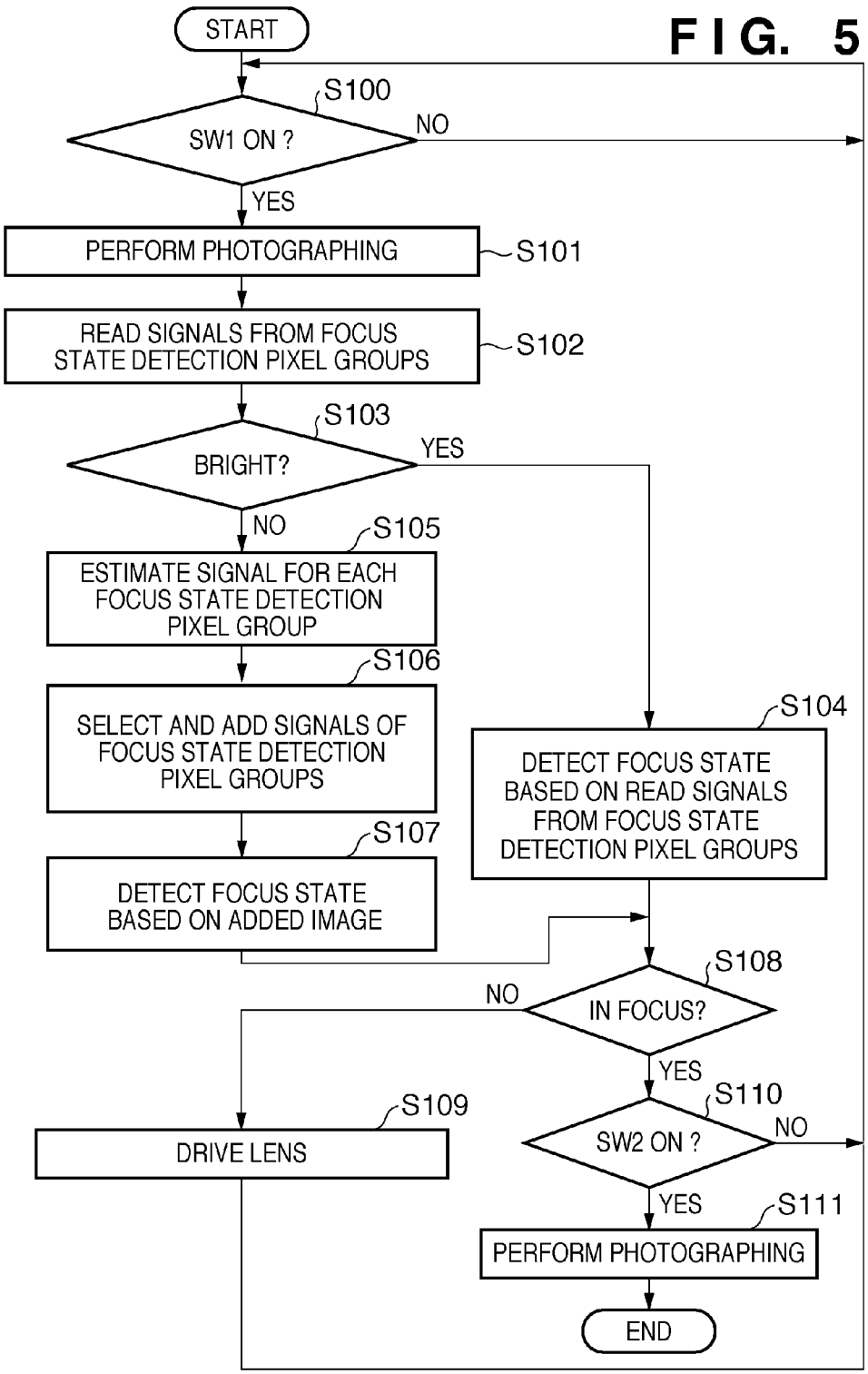
FIG. 5 is a flowchart for explaining focus state detection processing according to the first embodiment of the present invention.

Next, focus state detection processing of the digital camera as an optical device in the first embodiment will be explained with reference to FIG. 5 and FIGS. 6A to 6D. FIG. 5 is a flowchart for explaining focus state detection processing of the camera, and FIGS. 6A to 6D are views illustrating line images based on the image signal pairs obtained from the focus state detection pixel pairs of the image sensor 10.

When a user presses a shutter release switch (not shown), for example, half way (SW1 ON) in step S100, the CPU 20 sends a signal to the image sensor control circuit 21 and the image sensor 10 performs photographing (step S101). The image signals obtained by the photographing in the image sensor 10 are read via the image sensor control circuit 21 (step S102), and processed in the image processing circuit 24. The CPU 20 compares the luminance of an image of a subject processed by the image processing circuit 24 with a predetermined luminance, and determines whether the image of the subject is bright or not (step S103). If it is determined that the image of the subject is bright, it is determined that focus state detection can be performed with a high accuracy without adding outputs from the focus state detection pixel group which will be described later, and the focus state of the photographing lens 5 is detected on the basis of the output from a predetermined pixel group (step S104).

For example, the CPU 20 generates the first focus state detection image with signals from the focus state detection pixel group having the same electrode aperture as the focus state detection pixel Pα1. Similarly, the CPU 20 generates the second focus state detection image with signals from the focus state detection pixel group having the same electrode aperture as the focus state detection pixel Pβ1.

Figure 6A:
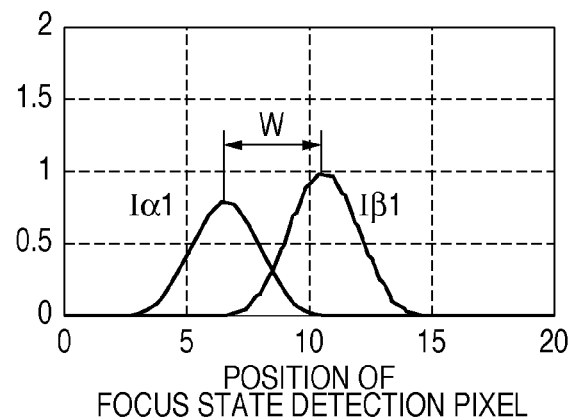
FIGS. 6A to 6D are views that illustrate examples of line image distribution charts generated by outputs of a focus state detection pixel group according to the first embodiment of the present invention.

FIG. 6A illustrates a line image Iα1 that is generated with signals from a focus state detection pixel group represented by the focus state detection pixel Pα1, and a line image distribution Iβ1 that is generated with signals from a focus state detection pixel group represented by the focus state detection pixel Pβ1. As shown by the distribution 401 and 402 in FIG. 4 of the received light of the image sensor 10, the surface area of the light receiving area Sα1 on the pupil of the photographing lens 5 of the focus state detection pixel Pα1 is slightly smaller than the surface area of the light receiving area Sβ1 on the pupil of the photographing lens 5 of the focus state detection pixel Pβ1. As a result, the signal level of the line image Iα1 is slightly smaller then the signal level of the line image Iβ1. Here, the positions of the electrode apertures of the focus state detection pixels Pα1 and Pβ1 are set so that the distance between the centers of mass of the line images Iα1 and Iβ1 become W at a predetermined defocus amount.

Further, the CPU 20 performs correlation operation based on the first and second focus state detection images, thereby detecting the focus state of the photographing lens 5 in an area where the focus state detection pixels Pα1 and Pβ1 are present.

Similarly, the CPU 20 generates a third focus state detection image with signals from the focus state detection pixel group having the same electrode aperture as the focus state detection pixel Pα2, and generates a fourth focus state detection image with signals from the focus state detection pixel group having the same electrode aperture as the focus state detection pixel Pβ2.

Figure 6B:
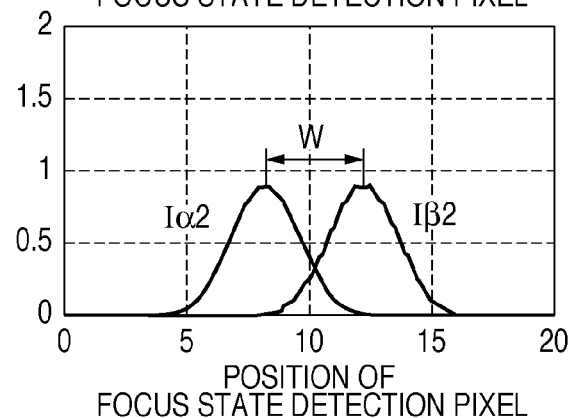

FIG. 6B illustrates a line image Iα2 that is generated with signals from a focus state detection pixel group represented by the focus state detection pixel Pα2, and a line image distribution Iβ2 that is generated with signals from a focus state detection pixel group represented by the focus state detection pixel Pβ2. As shown by the distribution 411 and 412 in FIG. 4 of the received light of the image sensor 10, the surface area of the light receiving area Sα2 on the pupil of the photographing lens 5 of the focus state detection pixel Pα2 is substantially equal to the surface area of the light receiving area Sβ2 on the pupil of the photographing lens 5 of the focus state detection pixel Pβ2. As a result, the signal level of the line image Iα2 is substantially the same as the signal level of the line image Iβ2. Here, the positions of the electrode apertures of the focus state detection pixels Pα2 and Pβ2 are set so that the distance between the centers of mass of the line images Iα2 and Iβ2 become W at a predetermined defocus amount.

Further, the CPU 20 performs correlation operation based on the third and fourth focus state detection images, thereby detecting the focus state of the photographing lens 5 in an area where the focus state detection pixels Pα2 and Pβ2 are present.

Similarly, the CPU 20 generates a fifth focus state detection image with signals from the focus state detection pixel group having the same electrode aperture as the focus state detection pixel Pα3, and generates a sixth focus state detection image with signals from the focus state detection pixel group having the same electrode aperture as the focus state detection pixel Pβ3.

Figure 6C:
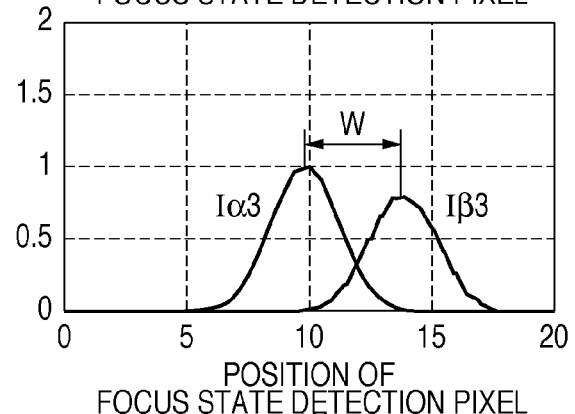

FIG. 6C illustrates a line image Iα3 that is generated with signals from a focus state detection pixel group represented by the focus state detection pixel Pα3, and a line image distribution Iβ3 that is generated with signals from a focus state detection pixel group represented by the focus state detection pixel Pβ3. As shown by the distribution 421 and 422 in FIG. 4 of the received light of the image sensor 10, the surface area of the light receiving area Sα3 on the pupil of the photographing lens 5 of the focus state detection pixel Pα3 is slightly larger than the surface area of the light receiving area Sβ3 on the pupil of the photographing lens 5 of the focus state detection pixel Pβ3. As a result, the signal level of the line image Iα3 is slightly larger then the signal level of the line image Iβ3. Here, the positions of the electrode apertures of the focus state detection pixels Pα3 and Pβ3 are set so that the distance between the centers of mass of the line images Iα3 and Iβ3 become W at a predetermined defocus amount.

Further, the CPU 20 performs correlation operation based on the fifth and sixth focus state detection images, thereby detecting the focus state of the photographing lens 5 in an area where the focus state detection pixels Pα3 and Pβ3 are present.

Further, the CPU 20 averages the focus state detection result of the photographing lens 5 in the area where the focus state detection pixels Pα1 and Pβ1 are present, the focus state detection result of the photographing lens 5 in the area where the focus state detection pixels Pα2 and Pβ2 are present, and the focus state detection result of the photographing lens 5 in the area where the focus state detection pixels Pα3 and Pβ3 are present.

Here, the base-line lengths between the focus state detection pixels Pα1 and Pβ1, between the focus state detection pixels Pα2 and Pβ2, and between the focus state detection pixels Pα3 and Pβ3 are designed to be the same so that the same parameters can be used in the correlation operation for focus detection, which prevents the correlation operation from becoming complicated.

Whereas, in FIG. 5, if it is determined that the image of the subject is dark (NO in step S103), the CPU 20 adds signals from the focus state detection pixel groups having different distributions of received light, thereby reduces the effect of noise included in the images of the focus state detection images, and performs focus detection.

Next, the CPU 20 calculates the distributions of received light on the pupil of the photographing lens 5 at the focus state detection positions as shown in FIG. 4 on the basis of the distributions of received light of a plurality of focus state detection pixels of the image sensor 10 stored in the memory circuit 22 and information of vignetting of light flux at a predetermined image height stored in the photographing lens 5. Thereafter, the CPU 20 estimates a signal for each focus state detection pixel group as shown by the line images of FIGS. 6A to 6D (step S105). Here, if the CPU 20 determines that the signal from a focus state detection pixel group is relatively small, the signals from the focus state detection pixel group is not added.

If the distribution of received light of the image sensor 10 is substantially the same as the designed value, and if little vignetting of light flux by the photographing lens 5 occurs, then the signals from the focus state detection pixels Pα1, Pα2 and Pα3 and the signals from the focus state detection pixels Pβ1, Pβ2 and Pβ3 can be added. The distribution of received light of the image sensor 10 when signals from the focus state detection pixels Pα1, Pα2 and Pα3 are added is as shown by 431 in FIG. 4. Further, the distribution of received light of the image sensor 10 when signals from the focus state detection pixels Pβ1, Pβ2 and Pβ3 are added is as shown by 432 in FIG. 4.

Figure 6D:
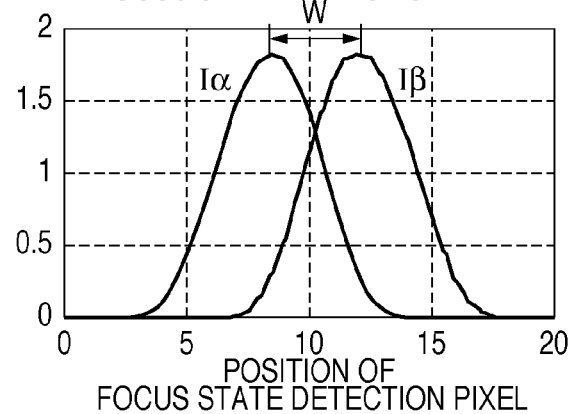

FIG. 6D shows line images of the added signals from the focus state detection pixel groups. The CPU 20 generates the line image Iα by adding the line image Iα1 from the focus state detection pixel Pα1, the line image Iα2 from the focus state detection pixel Pα2 and the line image Iα3 from the focus state detection pixel Pα3. Similarly, the CPU 20 generates the line image 4 by adding the line image Iβ1 from the focus state detection pixel Pβ1, the line image Iβ2 from the focus state detection pixel Pβ2 and the line image Iβ3 from the focus state detection pixel Pβ3.

Here, the CPU 20 selects the pixel groups whose signals are to be added so that the distance between the centers of mass of the line images before addition and the distance between the centers of mass of the line images after addition at a predetermined defocus amount are the same. By making the base-line length of the focus state detection image before addition and the base-line length of the focus state detection image after addition be the same, the same parameters can be used in the correlation operation for focus detection, which prevents the correlation operation from becoming complicated.

It should be noted that line images are used in the explanation with reference to FIGS. 6A to 6D, the addition can be performed in the same manner for a general subject.

After focus state detection pixels having different distributions of received light are selected and the addition is completed (step S106), then the focus state of the photographing lens 5 is detected based on the added image (step S107).

After the focus state of the photographing lens 5 is detected in step S104 or S107, the CPU 20 determines whether or not the photographing lens 5 is in focus on the basis of the focus state detection result (step S108). If it is determined that the photographing lens is not in focus (NO in step S108), then the CPU 20 sends focus control information to the photographing lens driving mechanism 51 based on the focus state detection result to drive the photographing lens 5 to perform focus control (step S109).

Whereas, if it is determined that the photographing lens 5 is in focus (YES in step S108), the CPU 20 checks full-stroke operation, for instance, of the shutter release switch (step S110). If the user confirms an image of the subject is in focus and performs full-stroke operation on the shutter release switch (SW2 ON) (YES in step S110), the CPU 20 sends a signal to the image sensor control circuit 21 to perform photographing by the image sensor 10 (step S111). The image signals obtained by the image sensor 10 are read out via the image sensor control circuit 21, and processed by the image processing circuit 24. At this time, the focus state detection pixels whose electrode apertures are limited are dealt with as defective pixels, and a signal corresponding to each of the focus state detection pixels is interpolated using signals from its surrounding pixels.

Further, the photographed image is recorded on the memory circuit 22 as well as displayed on the liquid crystal display element 9.

According to the first embodiment of the present invention as described above, if the distribution of received light of the image sensor 10 is substantially the same as the designed value, and if little vignetting of light flux by the photographing lens 5 occurs, all the pixel groups having the same base-line lengths and having the different distributions of received light are selected. Then, the signals from the selected pixel groups are added, and the focus state detection is performed based on the added signals. In this way, the focus state detection with reduced effect of noise can be performed.

Second Embodiment

The second embodiment of the present invention will be now explained. The schematic configuration of a digital camera used in the second embodiment is the same as the one explained with reference to FIGS. 1 to 3 in the above first embodiment, the explanation of it is omitted.

Figure 7:
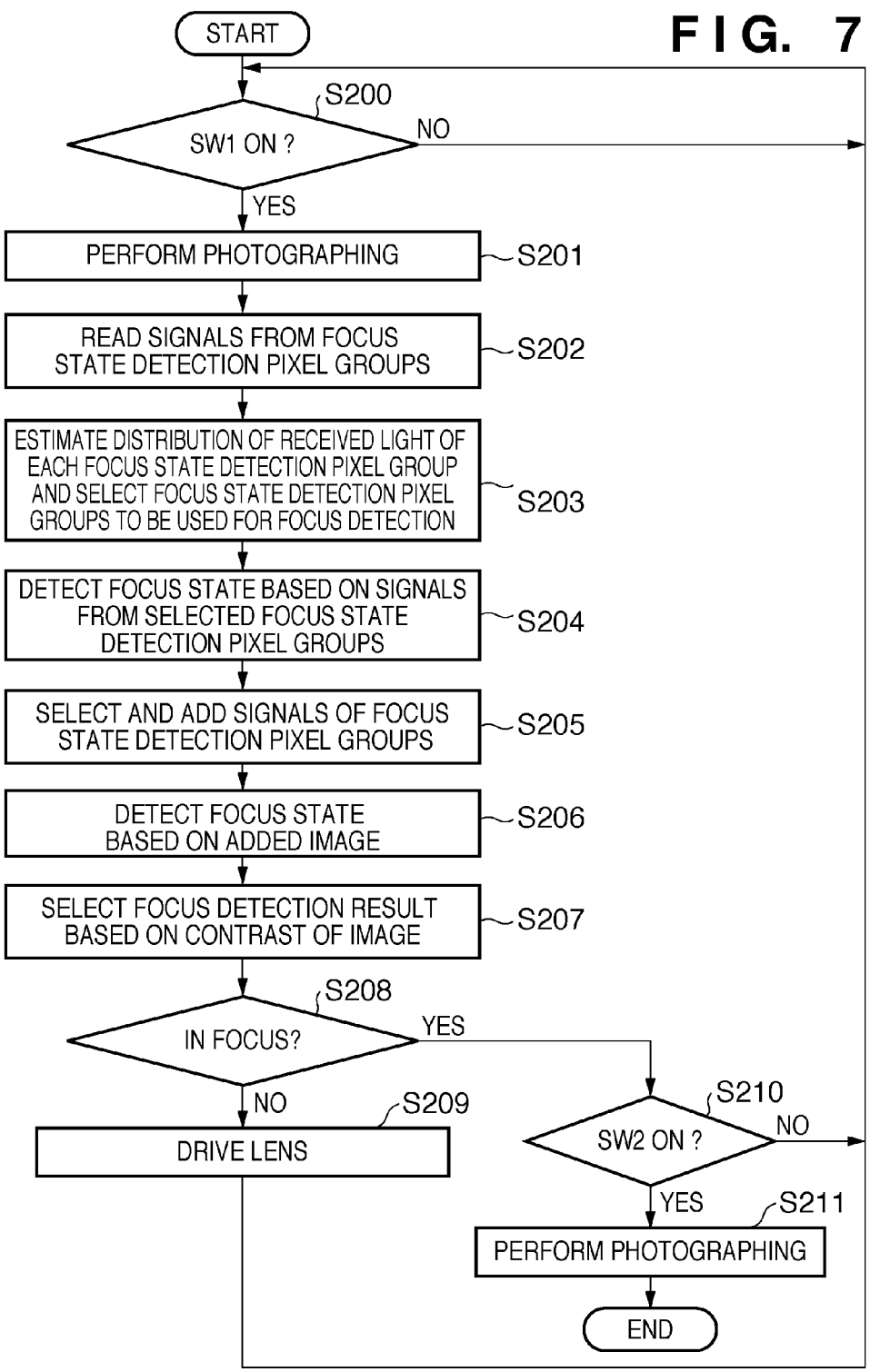
FIG. 7 is a flowchart for explaining focus state detection processing according to a second embodiment of the present invention.
Figure 8:
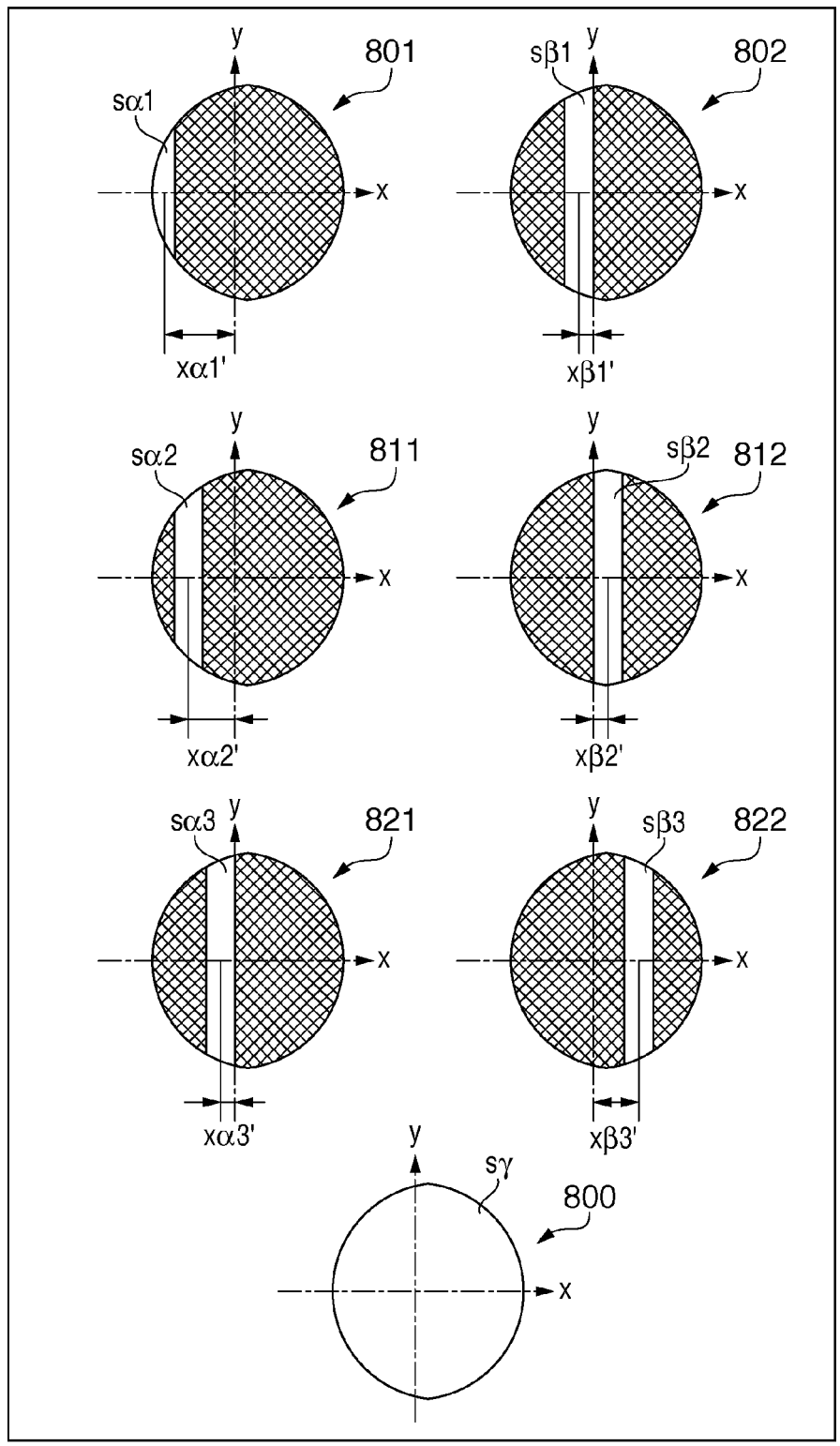
FIG. 8 is a view that illustrates an example of the distribution of received light on a pupil of a photographing lens of a focus state detection pixel that is arranged at a part of an image sensor in which there is a misalignment between a microlens and a first electrode according to the second embodiment of the present invention.

Next, focus state detection processing of the digital camera as an optical device in the second embodiment will be explained with reference to FIGS. 7, 8 and FIGS. 9A to 9D. FIG. 7 is a flowchart for explaining focus state detection processing of the camera, and FIG. 8 illustrates a designed distribution of received light on the pupil of the image sensing lens 5 of focus state detection pixels arranged on a part of the image sensor 10. FIGS. 9A to 9D are views illustrating line images based on the image signal pairs obtained from the focus state detection pixel pairs of the image sensor 10.

When a user presses a shutter release switch (not shown), for example, half way (SW1 ON) in step S200, the CPU 20 sends a signal to the image sensor control circuit 21, and the image sensor 10 performs photographing (step S201). The image signals obtained by the photographing in the image sensor 10 are read via the image sensor control circuit 21 (step S202).

Then, the CPU 20 estimates a signal from each focus state detection pixel group on the basis of the distributions of received light of a plurality of focus state detection pixels of the image sensor 10 stored in the memory circuit 22 and the information of vignetting of light flux at a predetermined image height stored in the photographing lens 5 (step S203). In the second embodiment, an example where relative positions of the microlens 153 and the aperture of the electrode 131 on the image sensor 10 are shifted from the designed values, and the focus state detection is performed using signals from the pixels arranged at the periphery of the photographing screen will be described.

Next, the CPU 20 calculates the distributions of received light on the pupil of the photographing lens 5 of the image sensor 10 as shown in FIG. 8 and line images formed from signals from focus state detection pixel groups as shown in FIGS. 9A to 9D on the basis of the distributions of received light of the focus state detection pixels and information of vignetting of light flux at a predetermined image height stored in the photographing lens 5. FIG. 8 shows the distribution of received light of a focus state detection pixel group located in the −x direction with respect to the center of the image sensor 10 in which the microlens 153 is shifted to −x direction from the designed value with reference to the aperture of the electrode 131. When the microlens 153 is shifted in the −x direction from the designed value with respect to the aperture of the electrode 131, the distributions of received light of the focus state detection pixels of the image sensor 10 also shift in the −x direction on the pupil of the photographing lens 5.

In a focus state detection pixel group that is positioned in the −x direction with respect to the center of the image sensor 10, light beams are vignetted from the −x direction side in the figure by the lens frame of the photographing lens 5.

In FIG. 8, reference numeral 801 denotes the distribution of received light on the pupil of the photographing lens 5 of the focus state detection pixel $P\alpha1$ shown in the partial plan view of the image sensor 10 in FIG. 3. The center of an aperture of the focus state detection pixel $P\alpha1$ defined by the electrode 131_3 and electrode 131_4, that is, the center of the light receiving area $S\alpha1$ of the photoelectric converter of the focus state detection pixel $P\alpha1$, is shifted significantly in the +x direction with respect to the center of the pixel. Accordingly, the center of the light receiving area $S\alpha1$ is further shifted by a distance $-x\alpha1'$ in the −x direction with respect to the optical axis (point of intersection of x-axis and y-axis in the figure) on the exit pupil of the photographing lens 5. Further, since light beams are vignetted from the −x direction side in the figure by the lens frame of the photographing lens 5, an area that is capable of receiving light of the focus state detection pixel $P\alpha1$ becomes narrower.

Reference numeral 802 denotes the distribution of received light on the pupil of the photographing lens 5 of the focus state detection pixel $P\beta1$ shown in the partial plan view of the image sensor 10 in FIG. 3. The center of an aperture of the focus state detection pixel $P\beta1$ defined by the electrode 131_1 and electrode 131_2, that is, the center of the light receiving area $S\beta1$ of the photoelectric converter of the focus state detection pixel $P\beta1$, approximately matches the center of the pixel. Accordingly, the center of the area $S\beta1$ is further shifted by a distance $-x\beta1'$ in the −x direction with respect to the optical axis (point of intersection of x-axis and y-axis in the figure) on the exit pupil of the photographing lens 5.

Figure 9A:
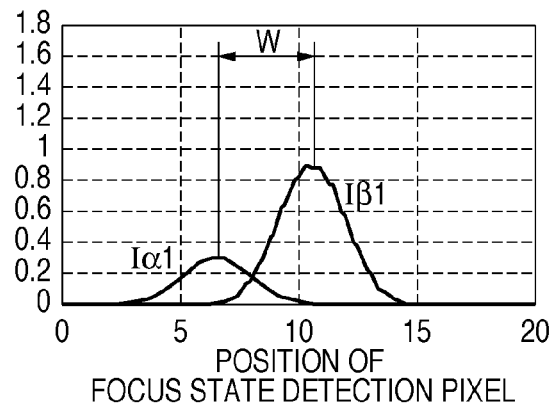
FIGS. 9A to 9D are views that illustrate examples of line image distribution charts generated by outputs of a focus state detection pixel group according to the second embodiment of the present invention.

FIG. 9A shows a line image distribution $I\alpha1$ that is generated with signals from a focus state detection pixel group represented by the focus state detection pixel $P\alpha1$, and a line image distribution $I\beta1$ that is generated with signals from a focus state detection pixel group represented by the focus state detection pixel $P\beta1$. Because the surface area of the light receiving area $S\alpha1$ on the pupil of the photographing lens 5 of the focus state detection pixel $P\alpha1$ and the surface area of the light receiving area $S\beta1$ on the pupil of the photographing lens 5 of the focus state detection pixel $P\beta1$ differ significantly, there is a large difference in output between the line image distribution $I\alpha1$ and the line image distribution $I\beta1$. As a result, even if detection of the focus state of the photographing lens 5 is performed using a focus state detection image generated with signals from the focus state detection pixel group represented by the focus state detection pixel $P\alpha1$ and a focus state detection image generated with signals from the focus state detection pixel group represented by the focus state detection pixel $P\beta1$, focus state detection cannot be performed with a high accuracy.

Therefore, according to the second embodiment, the distributions of received light on the pupil of the photographing lens 5 of the focus state detection pixel groups represented by the focus state detection pixels $P\alpha1$ and $P\beta1$, respectively, are estimated based on the distribution of received light of the individual focus state detection pixels, information regarding positions of the focus state detection pixels on the image sensor 10, and information of the photographing lens 5. The CPU 20 then judges whether or not focus state detection can be accurately performed based on images generated with the given focus state detection pixel groups. For example, the CPU 20 calculates a ratio between the surface area of the light receiving area $S\alpha1$ on the pupil of the photographing lens 5 corresponding to the focus state detection pixel $P\alpha1$ and the surface area of the light receiving area $S\beta1$ on the pupil of the photographing lens 5 corresponding to the focus state detection pixel $P\beta1$. Further, a configuration is adopted such that, focus state detection is performed using images obtained from focus state detection pixel groups having a surface area ratio within a predetermined range, and not performed using images obtained from focus state detection pixel groups having a surface area ratio outside the range (for example, two times or more or one half or less). According to the second embodiment, a ratio between the surface area of the light receiving area $S\alpha1$ on the pupil of the photographing lens 5 of the focus state detection pixel $P\alpha1$ and the surface area of the light receiving area $S\beta1$ on the pupil of the photographing lens 5 of the focus state detection pixel $P\beta1$ is approximately ⅓. Consequently, the CPU 20 does not execute focus state detection based on images obtained from the focus state detection pixel groups represented by the focus state detection pixels $P\alpha1$ and $P\beta1$.

Reference numeral 811 in FIG. 8 denotes the distribution of received light on the pupil of the photographing lens 5 of the focus state detection pixel $P\alpha2$ shown in the partial plan view of the image sensor 10 in FIG. 3. The center of an aperture of the focus state detection pixel $P\alpha2$ defined by the electrode 131_3 and electrode 131_4, that is, the center of the light receiving area $S\alpha2$ of the photoelectric converter of the focus state detection pixel $P\alpha2$, is shifted by a predetermined amount in the +x direction with respect to the center of the pixel. Accordingly, the center of the area $S\alpha2$ is shifted by a distance $-x\alpha2'$ further in the −x direction with respect to the optical axis (point of intersection of x-axis and y-axis in the figure) on the exit pupil of the photographing lens 5. Further, since light beams are vignetted from the −x direction side in the figure by the lens frame of the photographing lens 5, an light receiving area of the focus state detection pixel $P\alpha2$ becomes narrower.

Reference numeral 812 denotes the distribution of received light on the pupil of the photographing lens 5 of the focus state detection pixel Pβ2 shown in the partial plan view of the image sensor 10 in FIG. 3. The center of an aperture of the focus state detection pixel Pβ2 defined by the electrode 131_1 and electrode 131_2, that is, the center of the light receiving area Sβ2 of the photoelectric converter of the focus state detection pixel Pβ2, is shifted by a predetermined amount in the −x direction with respect to the center of the pixel. Accordingly, the center of the light receiving area Sβ2 is shifted by a distance xβ2' further in the −x direction with respect to the optical axis (point of intersection of x-axis and y-axis in the figure) on the exit pupil of the photographing lens 5.

Figure 9B:
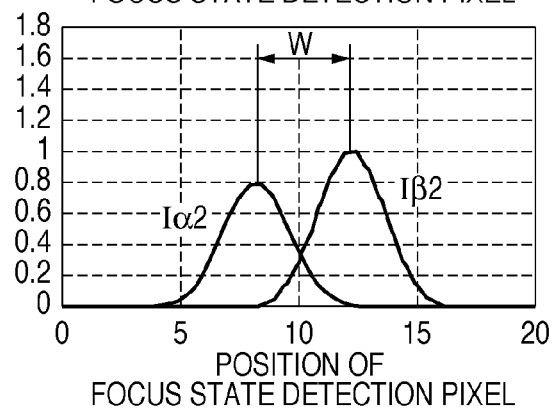

FIG. 9B shows a line image distribution Iα2 that is generated with signals from a focus state detection pixel group represented by the focus state detection pixel Pα2, and a line image distribution Iβ1 that is generated with signals from a focus state detection pixel group represented by the focus state detection pixel Pβ2. Because the surface area of the light receiving area Sα2 on the pupil of the photographing lens 5 of the focus state detection pixel Pα2 and the surface area of the light receiving area Sβ2 on the pupil of the photographing lens 5 of the focus state detection pixel Pβ2 differ somewhat, a difference in output arises to some extent between the line image distribution Iα2 and the line image distribution Iβ2.

Therefore, according to the second embodiment, the distribution of received light on the pupil of the photographing lens 5 of the focus state detection pixel groups represented by the focus state detection pixels Pα2 and Pβ2, respectively, is estimated based on the distribution of received light of the individual focus state detection pixels, information regarding positions of the focus state detection pixels on the image sensor 10, and information of the photographing lens 5. The CPU 20 then judges whether or not focus state detection can be accurately performed based on images generated with the given focus state detection pixel groups. For example, the CPU 20 calculates a ratio between the surface area of the light receiving area Sα2 on the pupil of the photographing lens 5 of the focus state detection pixel Pα2 and the surface area of the light receiving area Sβ2 on the pupil of the photographing lens 5 of the focus state detection pixel Pβ2. Further, a configuration is adopted such that, focus state detection is performed using images obtained from focus state detection pixel groups having a surface area ratio within a predetermined range and not performed using images obtained from focus state detection pixel groups having a surface area ratio outside the range (for example, two times or more or one half or less). According to the second embodiment, a ratio between the surface area of the light receiving area Sα2 on the pupil of the photographing lens 5 of the focus state detection pixel Pα2 and the surface area of the light receiving area Sβ2 on the pupil of the photographing lens 5 of the focus state detection pixel Pβ2 is approximately 4/5. Consequently, the CPU 20 performs focus state detection based on images obtained with signals from the focus state detection pixel groups represented by the focus state detection pixels Pα2 and Pβ2. At this time, for the images obtained with signals from the focus state detection pixel groups represented by the focus state detection pixels Pα2 and Pβ2, the CPU 20 performs gain correction based on the surface area ratio for the light receiving areas on the pupil of the photographing lens 5 that is previously obtained, thereby improving the focus state detection accuracy.

In FIG. 8, reference numeral 821 denotes the distribution of received light on the pupil of the photographing lens 5 of the focus state detection pixel Pα3 shown in the partial plan view of the image sensor 10 in FIG. 3. The center of an aperture of the focus state detection pixel Pα3 defined by the electrode 131_3 and electrode 131_4, that is, the center of the light receiving area Sα3 of the photoelectric converter of the focus state detection pixel Pα3, approximately matches the center of the pixel. Accordingly, the center of the light receiving area Sα3 is shifted by a distance −xα3' in the −x direction with respect to the optical axis (point of intersection of x-axis and y-axis in the figure) on the exit pupil of the photographing lens 5. Further, since light beams are vignetted from the −x direction side in the figure by the lens frame of the photographing lens 5, an area that is capable of receiving light of the focus state detection pixel Pα3 becomes narrower. In this case, the distribution of received light on the pupil of the photographing lens 5 of the focus state detection pixel Pα3 approximately matches the distribution of received light on the pupil of the photographing lens 5 of the focus state detection pixel Pβ1.

Reference numeral 822 denotes the distribution of received light on the pupil of the photographing lens 5 of the focus state detection pixel Pβ3 shown in the partial plan view of the image sensor 10 in FIG. 3. The center of an aperture of the focus state detection pixel Pβ3 defined by the electrode 131_1 and electrode 131_2, that is, the center of the light receiving area Sβ3 of the photoelectric converter of the focus state detection pixel Pβ3, is shifted significantly in the −x direction with respect to the center of the pixel. Accordingly, the center of the light receiving area Sβ3 is shifted by a distance xβ3' further in the −x direction with respect to the optical axis (point of intersection of x-axis and y-axis in the figure) on the exit pupil of the photographing lens 5.

Figure 9C:
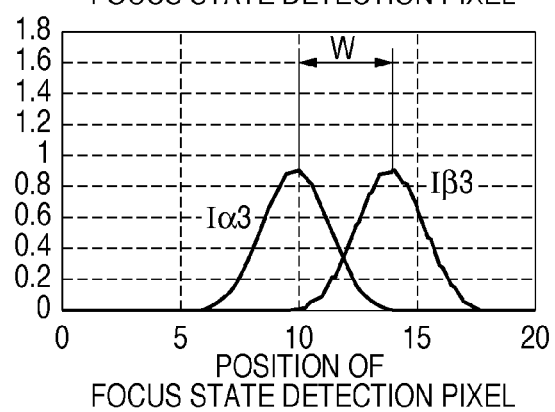

FIG. 9C shows a line image distribution Iα3 that is generated with signals from a focus state detection pixel group represented by the focus state detection pixel Pα3, and a line image distribution Iβ3 that is generated with signals from a focus state detection pixel group represented by the focus state detection pixel Pβ3. Because the surface area of the light receiving area Sα3 on the pupil of the photographing lens 5 of the focus state detection pixel Pα3 and the surface area of the light receiving area Sβ3 on the pupil of the photographing lens 5 of the focus state detection pixel Pβ3 are approximately the same, the outputs of the line image distribution Iα3 and the line image distribution Iβ3 are approximately the same.

Therefore, according to the second embodiment, the distribution of received light on the pupil of the photographing lens 5 of the focus state detection pixel groups represented by the focus state detection pixels Pα3 and Pβ3, respectively, is estimated based on the distribution of received light of the individual focus state detection pixels, information regarding positions of the focus state detection pixels on the image sensor 10, and information of the photographing lens 5. The CPU 20 then judges whether or not focus state detection can be accurately performed based on images generated with the given focus state detection pixel groups. For example, the CPU 20 calculates a ratio between the surface area of the light receiving area Sα3 on the pupil of the photographing lens 5 of the focus state detection pixel Pα3 and the surface area of the light receiving area Sβ3 on the pupil of the photographing lens 5 of the focus state detection pixel Pβ3. Further, a configuration is adopted such that focus state detection is performed using images obtained from focus state detection pixel groups having a surface area ratio within a predetermined range and not performed using images obtained from focus state detection pixel groups having a surface area ratio outside the range (for example, two times or more or one half or less). According to the second embodiment, a ratio between the surface area of the light receiving area Sα3 on the pupil of the photographing lens 5 of the focus state detection pixel Pα3 and the surface area of the light receiving area Sβ3 on the pupil of the photographing lens 5 of the focus state detection pixel Pβ3 is approximately 1. Consequently, the CPU 20 performs focus state detection based on images obtained with the focus state detection pixel groups represented by the focus state detection pixels Pα3 and Pβ3.

In FIG. 8, reference numeral 800 denotes the distribution of received light on the pupil of the photographing lens 5 of a normal imaging pixel shown in the partial plan view of the image sensor 10 in FIG. 3. The first electrode 131 of the normal imaging pixel is configured so as not to block the transmittance of light to the photoelectric converter. Hence, the photoelectric converter of the normal imaging pixel can receive light beams transmitted through the entire pupil area Sγ of the photographing lens 5. However, because light beams from the −x direction side in the figure are vignetted by the lens frame of the photographing lens 5, an area that is capable of receiving light becomes narrower.

According to the second embodiment as described above, the CPU 20 forming an optical device determines whether or not the distributions of received light of the focus state detection pixels are inclined due to the shift of the relative positions of the microlens 153 and the aperture of the electrode 131 in the image sensor 10 with respect to the designed value, and whether or not the vignetting of light flux by the lens frame of the photographing lens 5 is large. Then focus detection pixel groups to be used for focus state detection are selected on the basis of the determination result (step S203).

Further, the CPU 20 detects the focus state of the photographing lens 5 based on the signals from the selected focus state detection pixel groups (pixel groups of the focus state detection pixels Pα2 and Pβ2 and pixel groups of the focus state detection pixels Pα3 and Pβ3). Further, the CPU 20 averages the focus state detection result of the photographing lens 5 in the area where the focus state detection pixels Pα2 and Pβ2 are present, and the focus state detection result of the photographing lens 5 in the area where the focus state detection pixels Pα3 and Pβ3 are present, then obtains the focus state (step S204).

Figure 9D:
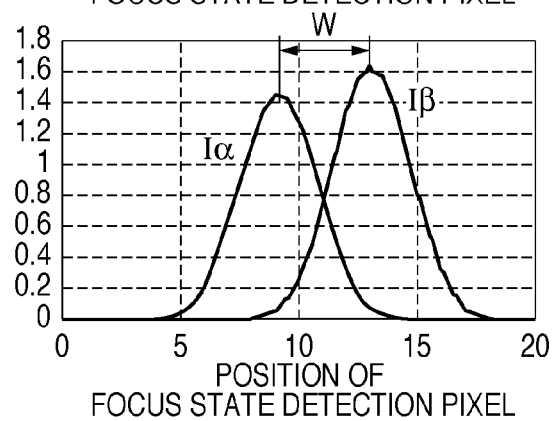
Figure 10:
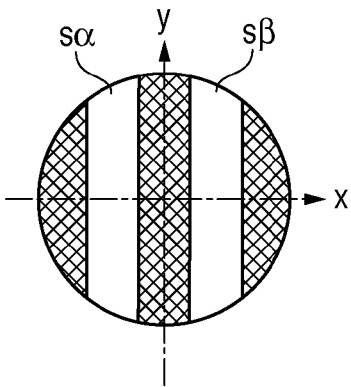
FIG. 10 is a view that illustrates an example of the distribution of received light of a conventional solid-state image sensing element.
Figure 11A:
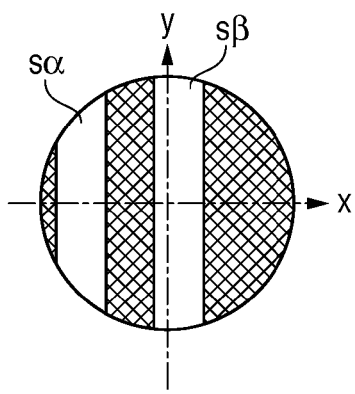
FIG. 11A and FIG. 11B are views that illustrate another example of the distribution of received light of a conventional solid-state image sensing element.
Figure 11B:
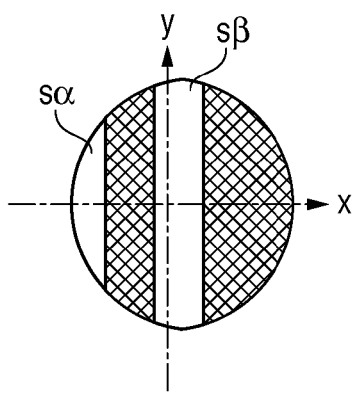

Further, the CPU 20 adds signals from the focus state detection pixel groups having different distributions of received light (step S205). At this time, the CPU 20 estimates a signal from each focus state detection pixel group on the basis of the distributions of received light of a plurality of focus state detection pixels of the image sensor 10 stored in the memory circuit 22 and the information of vignetting of light flux at a predetermined image height stored in the photographing lens 5. If the difference between two images generated from signals from focus state detection pixel groups is greater than a predetermined value, the signals from the focus state detection pixel groups are not added. In the second embodiment, the signals from the pixel groups of the focus state detection pixels Pα2 and Pβ2 and the signals from the pixel groups of the focus state detection pixels Pα3 and Pβ3 are added. FIG. 9D shows line images obtained as a result of addition, and as seen FIG. 9D, the CPU 20 selects the pixel groups whose signals are to be added so that the distance between the centers of mass of the line images before addition and the distance between the centers of mass of the line images after addition at a predetermined defocus amount are the same.

After signals from the selected focus state detection pixel groups are added by the CPU 20 (step S205), the focus state of the photographing lens 5 is detected based on the added image (step S206).

Then, the focus state detection result obtained by averaging the focus state detection results of the photographing lens 5 in the area where the focus state detection pixels Pα2 and Pβ2 are present and in the area where the focus state detection pixels Pα3 and Pβ3 are present, and the focus state detection result obtained by adding the signals from the pixel groups of the focus state detection pixels Pα2 and Pβ2 and the signals from the pixel groups of the focus state detection pixels Pα3 and Pβ3 are acquired. Then, when both of the focus state detection results are obtained, the CPU 20 decides the final focus detection result on the basis of the contrast of the images used for focus state detection (step S207).

For example, if the contrast of images used for the focus state detection is low, or if the signal levels of the images used for the focus state detection is low, the CPU 20 decides the focus state detection result obtained by adding the signals from the pixel groups of the focus state detection pixels Pα2 and Pβ2 and the signals from the pixel groups of the focus state detection pixels Pα3 and Pβ3 as the final focus state detection result (step S207).

After the focus state detection result of the photographing lens 5 is selected (step S207), the CPU 20 determines whether or not the photographing lens 5 is in focus on the basis of the focus state detection result (step S208). If it is determined that the photographing lens is not in focus (NO in step S208), then the CPU 20 sends focus control information to the photographing lens driving mechanism 51 based on the focus state detection result to drive the photographing lens 5 to perform focus control (step S209).

Whereas, if it is determined that the photographing lens 5 is in focus (YES in step S208), the CPU 20 checks full-stroke (SW2 ON) operation, for instance, of the shutter release switch (step S210). If the user confirms an image of the subject is in focus and performs full-stroke operation on the shutter release switch (SW2 ON) (YES in step S210), the CPU 20 sends a signal to the image sensor control circuit 21 to perform photographing by the image sensor 10 (step S211). The image signals obtained by the image sensor 10 are read out via the image sensor control circuit 21, and processed by the image processing circuit 24. At this time, the focus state detection pixels whose electrode apertures are limited are dealt with as defective pixels, and a signal corresponding to each of the focus state detection pixels is interpolated using signals from its surrounding pixels.

Further, the photographed image is recorded on the memory circuit 22 as well as displayed on the liquid crystal display element 9.

According to the second embodiment as described above, the focus state detection with adding signals from the focus state detection pixel groups and the focus state detection without adding signals from the focus state detection pixel groups are performed, and one of the focus state detection results is selected. In this way, it is possible to achieve the same effects as those achieved in the first embodiment.

Further, it should be noted that the first and second embodiments can be appropriately combined to realize the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-121348, filed on May 19, 2009 which is hereby incorporated by reference herein in its entirety.

The invention claimed is:

1. An optical device comprising:
   an image sensor having a plurality of pixels configured to output signals to be used for detecting a focus state of a photographing lens, the plurality of pixels including:
   a plurality of first focus state detection pixel pairs that respectively receive a pair of light fluxes having transmitted different pupil areas of the photographing lens, and
   a plurality of second focus state detection pixel pairs that respectively receive a pair of light fluxes having transmitted pupil areas shifted by a predetermined amount from the pupil areas of the photographing lens where the pair of light fluxes received by the first focus state detection pixel pairs have transmitted; and
   a detection unit configured to detect the focus state based on the signals output from the first and second focus state detection pixel pairs,
   wherein the detection unit:
      selects signals to be added so that respective base-line lengths of the first and second focus state pixel pairs and a base-line length corresponding to the added signals are equal to each other at a time of adding the signals output from the first and second focus state pixel pairs if the subject to be photographed is darker than a predetermined brightness,
      detects the focus state based on signal pairs obtained by adding the selected signals output from the plurality of first focus state detection pixel pairs and the signals output from the plurality of second focus state detection pixel pairs, respectively, if a subject to be photographed is darker than the predetermined brightness, and
      detects the focus state based on signal pairs output from the plurality of first focus state detection pixel pairs and signal pairs output from the plurality of second focus state detection pixel pairs, respectively, if a subject to be photographed is the same or brighter than the predetermined brightness.

2. The optical device according to claim 1, wherein the detection unit further calculates distributions of received light of the first and second focus state detection pixel pairs at each position on the image sensor based on image height, obtains a ratio between the distributions of received light for each of the first and second focus state detection pixel pairs, and performs the focus detection using signals from the first and second focus state detection pixels having the ratio within a predetermined range.

3. The optical device according to claim 1, wherein the image sensor is an image sensor used for photographing an image, and a part of pixels of the image sensor are configured as the first and second focus state detection pixel pairs.

4. A focus detection method in an optical device comprising an image sensor having a plurality of pixels for outputting signals to be used for detecting a focus state of a photographing lens, the plurality of pixels including a plurality of first focus state detection pixel pairs that respectively receive a pair of light fluxes having transmitted different pupil areas of the photographing lens, and a plurality of second focus state detection pixel pairs that respectively receive a pair of light fluxes having transmitted pupil areas shifted by a predetermined amount from the pupil areas of the photographing lens where the pair of light fluxes received by the first focus state detection pixel pairs have transmitted, said method comprising:
   a determination step of determining whether or not a subject to be photographed is brighter than a predetermined brightness;
   a selection step of selecting signals to be added so that respective base-line lengths of the first and second focus state pixel pairs and a base-line length corresponding to the added signals are equal to each other at a time of adding the signals output from the first and second focus state pixel pairs if the subject to be photographed is darker than the predetermined brightness;
   a first detection step of detecting the focus state based on signal pairs obtained by adding the selected signals output from the plurality of first focus state detection pixel pairs and the signals output from the plurality of second focus state detection pixel pairs, respectively, if the subject to be photographed is darker than the predetermined brightness; and
   a second detection step of detecting the focus state based on signal pairs output from the plurality of first focus state detection pixel pairs and signal pairs output from the plurality of second focus state detection pixel pairs, respectively, if a subject to be photographed is the same or brighter than the predetermined brightness.

* * * * *